US012347969B2

(12) United States Patent
Brhel

(10) Patent No.: US 12,347,969 B2
(45) **Date of Patent: *Jul. 1, 2025**

(54) GROUNDING ELECTRICAL CONNECTOR

(71) Applicant: Lear Corporation, Southfield, MI (US)

(72) Inventor: Michal Brhel, Šardice (CZ)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,353

(22) Filed: Nov. 10, 2023

(65) Prior Publication Data

US 2024/0079799 A1 Mar. 7, 2024

Related U.S. Application Data

(63) Continuation of application No. 17/116,473, filed on Dec. 9, 2020, now Pat. No. 11,837,806.

(51) Int. Cl.

*H01R 13/627* (2006.01)
*H01R 13/436* (2006.01)
*H01R 13/52* (2006.01)
*H01R 11/12* (2006.01)

(52) U.S. Cl.

CPC ..... *H01R 13/6272* (2013.01); *H01R 13/4361* (2013.01); *H01R 13/5219* (2013.01); *H01R 11/12* (2013.01)

(58) Field of Classification Search

CPC ........................ H01R 11/12; H01R 13/4361; H01R 13/5219; H01R 13/6272; H01R 13/639

USPC ........................ 439/351, 352, 752, 271, 595

See application file for complete search history.

(56) References Cited

U.S. PATENT DOCUMENTS

| | | | | |
|---|---|---|---|---|
| 5,595,509 | A | 1/1997 | Rupert et al. | |
| 5,928,038 | A | 7/1999 | Berg et al. | |
| 7,495,932 | B2 | 2/2009 | Reyes et al. | |
| 7,544,081 | B2 | 6/2009 | Lim | |
| 8,137,116 | B2 | 3/2012 | Omori et al. | |
| 8,419,485 | B2 | 4/2013 | Stausser et al. | |
| 9,054,458 | B1 | 6/2015 | Ng | |
| 9,083,094 | B2 | 7/2015 | Teramoto | |
| 9,099,803 | B2 | 8/2015 | Omori et al. | |
| 9,124,032 | B2 | 9/2015 | Arakelian | |
| 9,300,093 | B2 | 3/2016 | Omori et al. | |
| 9,667,017 | B2 * | 5/2017 | Suzuki ................ | H01R 11/09 |
| 9,742,116 | B1 | 8/2017 | Nishiyama | |
| 9,761,978 | B2 * | 9/2017 | Kim .................... | H01R 13/73 |
| 9,787,014 | B2 | 10/2017 | Nagasawa | |

(Continued)

FOREIGN PATENT DOCUMENTS

GB 2544412 A 5/2017

*Primary Examiner* — Marcus E Harcum

(74) *Attorney, Agent, or Firm* — MacMillan, Sobanski & Todd, LLC

(57) ABSTRACT

A grounding electrical connector assembly may have a connector subassembly and a terminal subassembly. The connector subassembly may include a connector housing having a body defining a terminal cavity therein and a ground bar, secured to the connector housing, having electrical contacts extending into the terminal cavity and a portion that secures to grounding structure. The terminal subassembly may include a terminal housing having a main body defining terminal cavities extending therethrough that each receive one of a plurality of terminals, the main body telescopically slidable into and releasably secured to the terminal cavity.

13 Claims, 6 Drawing Sheets

(56) References Cited

U.S. PATENT DOCUMENTS

| | | | | |
|---|---|---|---|---|
| 10,573,991 | B2 * | 2/2020 | Matsumoto | H01R 13/501 |
| 10,855,025 | B2 | 12/2020 | Holub et al. | |
| 2001/0046814 | A1 | 11/2001 | Tsuji et al. | |
| 2004/0248453 | A1 | 12/2004 | McLauchlan et al. | |
| 2008/0124966 | A1 | 5/2008 | Lim et al. | |
| 2013/0137285 | A1 | 5/2013 | Miura et al. | |
| 2014/0235090 | A1 | 8/2014 | Omori et al. | |
| 2015/0180163 | A1 | 6/2015 | Saitoh | |
| 2015/0295354 | A1 * | 10/2015 | Morello | H01R 13/6272 439/352 |
| 2015/0295357 | A1 | 10/2015 | Campbell et al. | |
| 2016/0013575 | A1 | 1/2016 | Campbell et al. | |
| 2016/0064852 | A1 | 3/2016 | Saitoh et al. | |
| 2016/0099522 | A1 | 4/2016 | Suzuki et al. | |
| 2016/0156125 | A1 | 6/2016 | Osada et al. | |
| 2021/0249819 | A1 | 8/2021 | Son et al. | |
| 2022/0006229 | A1 | 1/2022 | Carlson et al. | |
| 2022/0173552 | A1 | 6/2022 | Kim et al. | |

* cited by examiner

GROUNDING ELECTRICAL CONNECTOR

CROSS-REFERENCE TO RELATED APPLICATION

This application is a continuation patent application of U.S. patent application Ser. No. 17/116,473, filed Dec. 9, 2020, the disclosure of which is incorporated herein by reference.

BACKGROUND OF THE INVENTION

This invention relates to an electrical connector, and more particularly to a grounding electrical connector (dead end electrical connector).

Grounding electrical connectors may be employed to ground wiring to a grounding structure. Such electrical connectors may be eyelets, with each eyelet being connected to a wire and fastened to grounding structure. For applications with many wires, this may require many eyelets and fasteners, as well as fastening locations, which may be undesirable. Some have attempted to overcome this by employing a housing having multiple terminals for receiving multiple wires for grounding and a grounding bar fastened to grounding structure. However, the installation and removal may require a tool under essentially all circumstances as the fastener must be installed or removed to remove the housing. Moreover, the wires may be attached to the terminals while installing or removing the housing/grounding bar, thus the wires may be in the way, making the installation or removal more difficult. This may be especially true in situations where the area around the grounding housing is crowded with other components. Such situations may arise, for example, in vehicle applications, where packaging space is at a premium.

SUMMARY OF THE INVENTION

According to an aspect, the invention provides a grounding electrical connector assembly that allows for grounding of multiple terminals (multi-wire grounding) with a single fastener attached to grounding structure, while allowing for ease of installation and removal of the connector assembly. The connector assembly may support different size terminals for grounding.

According to an aspect, the invention provides a grounding electrical connector assembly that comprises two subassemblies, allowing for ease of assembly and disassembly of the connector assembly, while providing liquid tight sealing for the terminals and between the housing sections. Terminals are secured in a terminal housing, while allowing a terminal subassembly to be securely mounted to and easily removed from a connector subassembly. This allows for the terminals to be moved with the terminal subassembly while the connector subassembly remains secured to the grounding structure. Additionally, the terminals are easily reconnected with a ground bus bar when the terminal subassembly and connector subassembly are reassembled.

According to another aspect, the invention provides a grounding electrical connector assembly having a connector subassembly and a terminal subassembly. The connector subassembly may include a connector housing having a body defining a terminal cavity therein and a ground bar, secured to the connector housing, having electrical contacts extending into the terminal cavity and a portion configured to secure to grounding structure. The terminal subassembly may include a terminal housing having a main body defining a plurality of terminal cavities extending therethrough configured to each receive one of a plurality of terminals, the main body telescopically slidable into the terminal cavity, the terminal housing having a retention arm extending from the main body radially outward from the body of the connector housing to form a circumferential gap between the main body and the retention arm, and with the terminal subassembly including a radial seal in the gap that is compressed against the retention arm by the body when the terminal subassembly is assembled to the connector subassembly.

According to another aspect, the invention provides for a grounding electrical connector assembly having a connector subassembly and a terminal subassembly. The connector subassembly may include a connector housing having a body defining a terminal cavity therein, a ground bar, secured to the connector housing, having electrical contacts extending into the terminal cavity and a portion configured to secure to grounding structure, and a terminal-connector lock retained by and telescopically slidable in a slot of the connector housing. The terminal subassembly may include a terminal housing having a main body defining a plurality of terminal cavities extending therethrough configured to each receive one of a plurality of terminals, the main body telescopically slidable into the terminal cavity, the terminal housing having a retention arm extending from the main body radially outward from the body of the connector housing, and with the retention arm releasably secured to the connector housing when the terminal subassembly is assembled to the connector subassembly and the terminal-connector lock is moved to a lock position.

According to another aspect, the invention provides for a grounding electrical connector assembly having a connector subassembly and a terminal subassembly. The connector subassembly may include a connector housing having a body defining a terminal cavity therein and a ground bar, secured to the connector housing, having electrical contacts extending into the terminal cavity and a portion configured to secure to grounding structure. The terminal subassembly may include a terminal housing having a main body defining a plurality of terminal cavities extending therethrough configured to each receive one of a plurality of terminals, the main body telescopically slidable into the terminal cavity, the main body defining terminal lock recesses extending through the main body generally normal to the terminal cavities, the terminal subassembly including a terminal position lock configured to be slidable in the terminal lock recesses to releasably retain the plurality of terminals in the terminal housing when in a retention position, and with the terminal position lock configured to be prevented from moving out of the retention position by the connector housing when the terminal subassembly is assembled to the connector subassembly.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 11:
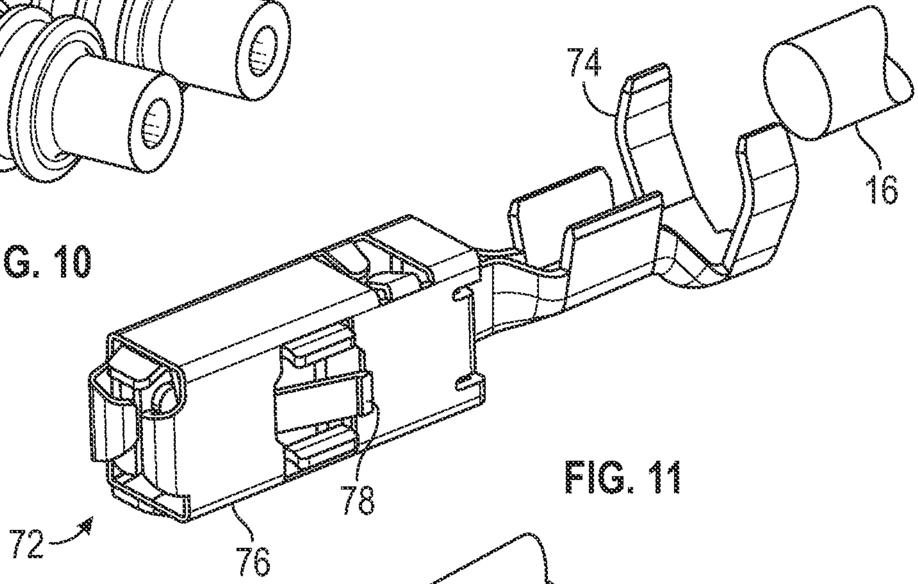
FIG. 11 is a schematic, perspective view of a terminal and wire that may be retained in the terminal housing.
Figure 12:
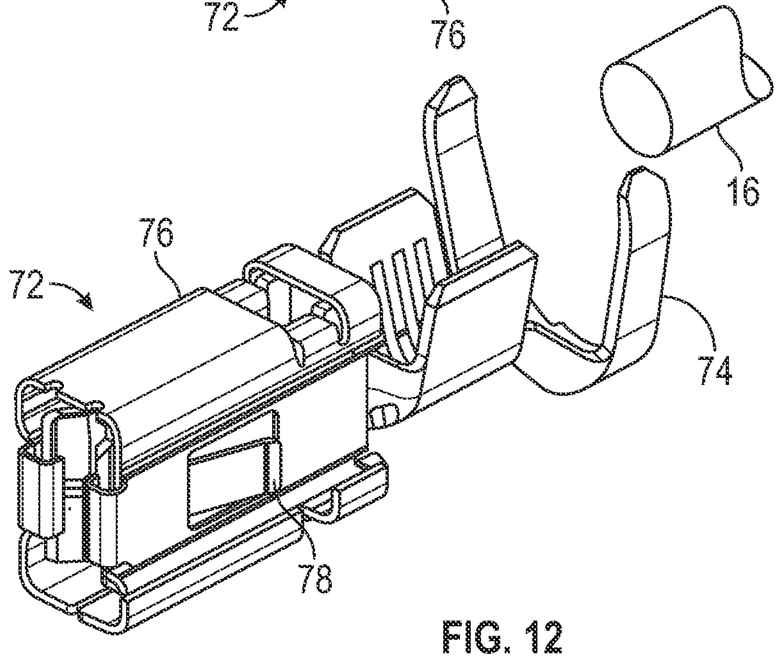
FIG. 12 is a schematic, perspective view of another terminal and wire that may be retained in the terminal housing.

Referring now to the drawings, there is illustrated in FIGS. 1-9 a grounding electrical connector assembly 20 (sealed dead end connector) and a grounding bolt 22 (shown in FIGS. 1-4). The grounding bolt 22 is configured to mount to grounding structure 18 (shown schematically in FIG. 1) to electrically ground wires/cables 16 (shown schematically in FIGS. 11 and 12) that are secured to the connector assembly 20. For example, when employed in automotive vehicle applications, the grounding bolt 22 attaches to vehicle structure 18 to ground the wires/cables 16 to that vehicle structure 18.

The assembly 20 may include a ground bus bar 24, which is secured to the grounding bolt 22. The bus bar 24 may include an anti-rotation feature, such as for example a non-circular opening 26 (seen best in FIGS. 5 and 8) that receives the bolt 22. The bolt 22 may have a corresponding non-circular portion of an outer surface that mates with the opening 26, thus assuring that the bus bar 24 does not rotate relative to the bolt 22. The bus bar 24 may employ other anti-rotation features instead of or in addition to the opening 26, such as for example a feature (not shown) extending from the bus bar's surface that engages the grounding structure 18 to maintain the desired orientation of the connector assembly 20 relative to the grounding structure 18. The bus bar 24 may also include a plurality of electrical contacts 28 (best seen in FIGS. 8-9), which may be secured (e.g., by molding) to a connector housing 30. For example, the connector housing 30 may be over-molded onto a portion of the bus bar 24.

The connector housing 30 may include a body 32, which includes a flange 34 that mates with and is secured to the bus bar 24, and a terminal cavity 36 (best seen in FIG. 9) that telescopically receives a portion of a terminal housing 40. The ends of the electrical contacts 28 may extend into the terminal cavity 36. The body 32 may also include a shoulder 42 having a first slot 44 (best seen in FIGS. 5-7) that receives a retention arm 46 of the terminal housing 40, and a second slot 48 that receives a terminal-connector lock 50.

The terminal-connector lock 50 may include a finger pull 52 that may have a latch 54 (best seen in FIGS. 3 and 5) cantilevered therefrom, with the latch 54 releasably engageable with the second slot 48. The terminal-connector lock 50 may also include a pair of arms 56 extending from the finger pull 52 in generally the same direction as the latch 54, with the arms 56 telescopically slidable in the second slot 48. The arms 56 of the terminal-connector lock 50 may slide into the second slot 48 far enough to secure the retention arm 46 of the terminal housing 40 in the first slot 44.

The terminal housing 40 may include a main body 58, around which the retention arm 46 extends, leaving a circumferential gap 60 (best seen in FIGS. 2 and 6-8) between the free end 62 of the retention arm 46 and the main body 58. A radial seal 66 may extend around the main body 58 in the gap 60 (best seen in FIGS. 2, 6 and 7), providing a liquid tight seal between the connector housing 30 and the terminal housing 40 when the two are assembled together. The free end 62 of the retention arm 46 may have a retention barb 64 (best seen in FIGS. 2, and 6-8) extending radially outward along a portion of the free end 62 that is received in the first slot 44.

The main body 58 of the terminal housing 40 may also include multiple terminal passages 70 (best seen in FIGS. 5-8). In the exemplary embodiment shown in the Figures, six terminal passages 70 are shown—two larger and four smaller to accommodate different sizes of terminals 72 (see FIGS. 11 and 12). One skilled in the art will recognize that different numbers of terminal passages 70 may be employed for the particular grounding application and they may be all one size or different numbers of varying sizes, again depending upon the particular grounding application. The terminals 72 are each telescopically inserted into a respective one of the terminal passages 70, thus for the example shown, two larger and four smaller terminals 72 may be employed. Each of the terminals 72 may include flanges 74 for securing electrical wires 16 (see FIGS. 11 and 12) to the terminals 72 prior to insertion in the terminal passages 70, and terminal housings 76 with retention mechanisms 78 for securing the terminals 72 in their respective terminal passages 70. The terminals 72 extend into the terminal passages 70 far enough so that each contacts a respective electrical contact 28, which also may extend into the terminal passages 70, when the terminal housing 40 is assembled to the connector housing 30.

Figure 1:
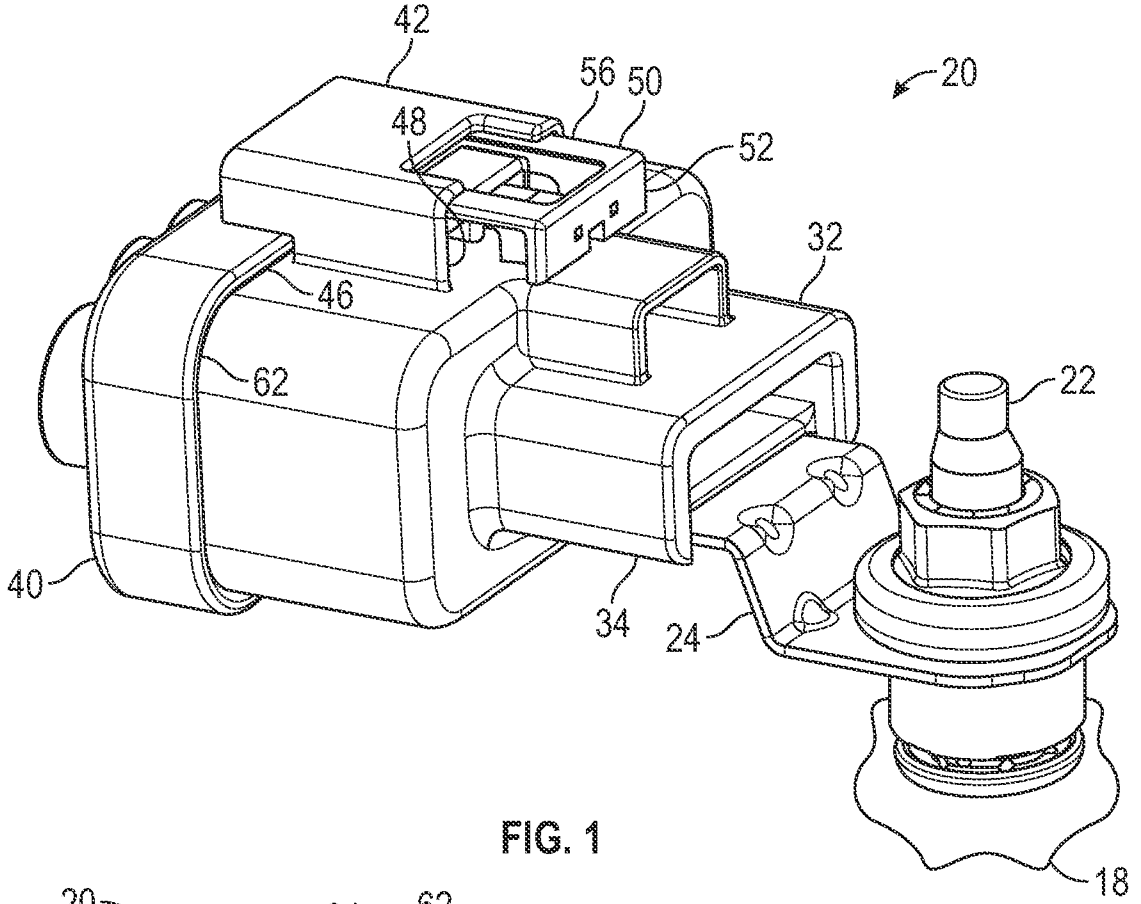
FIG. 1 is a schematic, perspective view of a grounding electrical connector assembly, a grounding bolt, and grounding structure.
Figure 2:
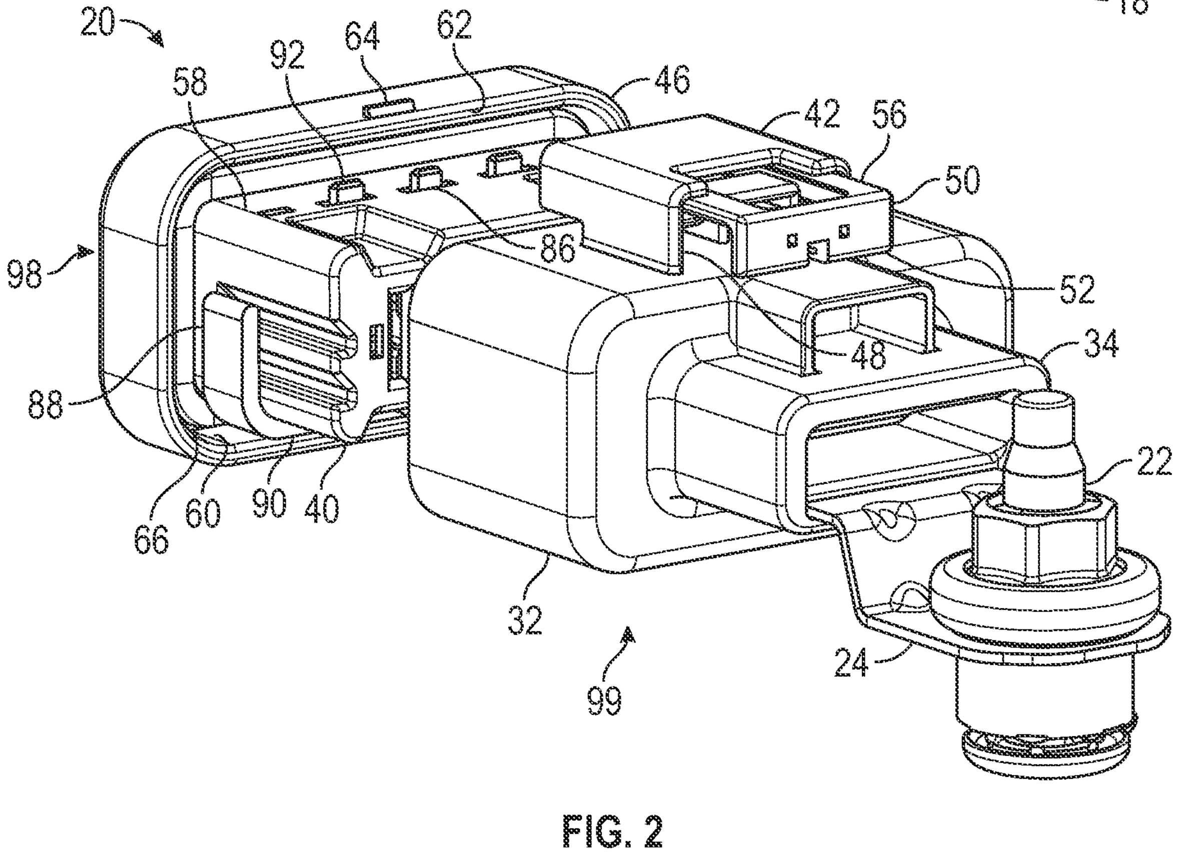
FIG. 2 is a schematic, partially exploded, perspective view of the grounding electrical connector assembly and grounding bolt, with a terminal subassembly separated from a connector subassembly.
Figure 3:
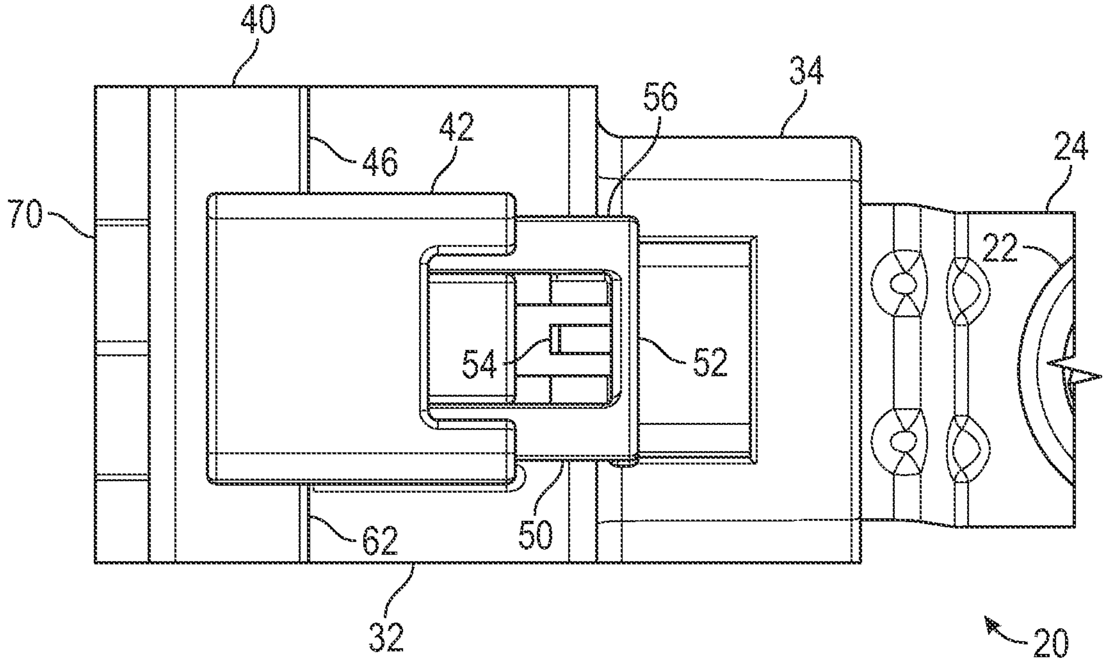
FIG. 3 is a schematic, side view of a portion of the grounding electrical connector assembly and grounding bolt, with a terminal-connector lock shown in the release position.
Figure 4:
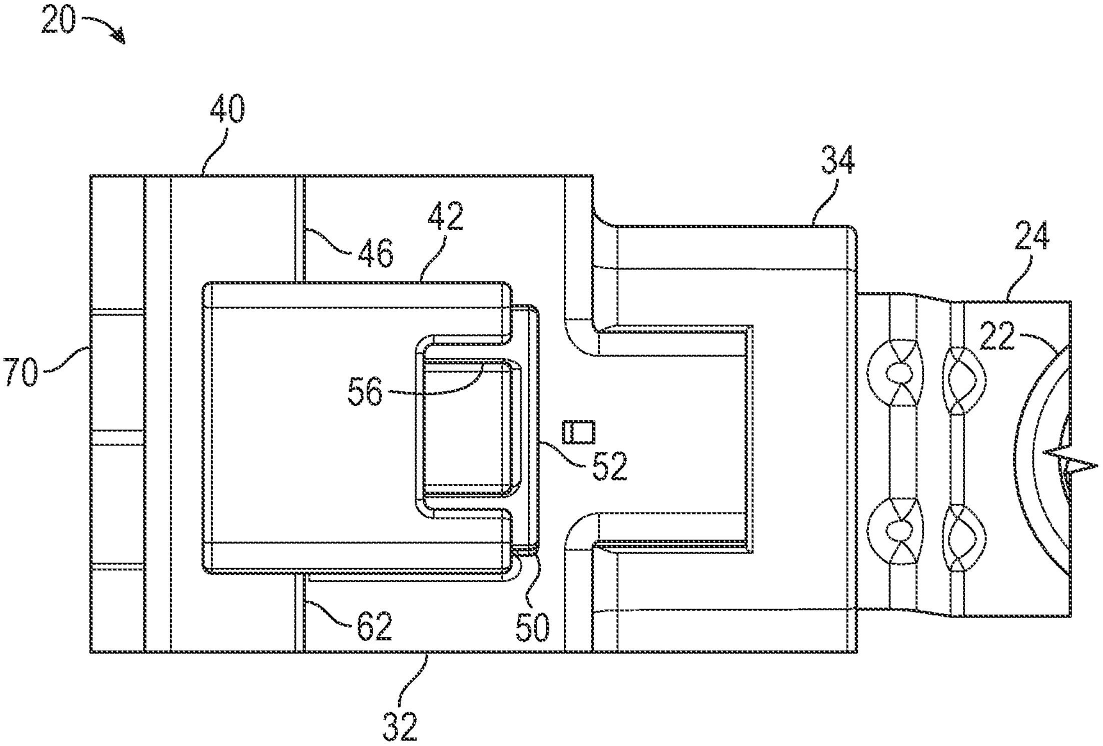
FIG. 4 is a schematic, side view similar to FIG. 3, but with the terminal-connector lock shown in the locked position.
Figure 5:
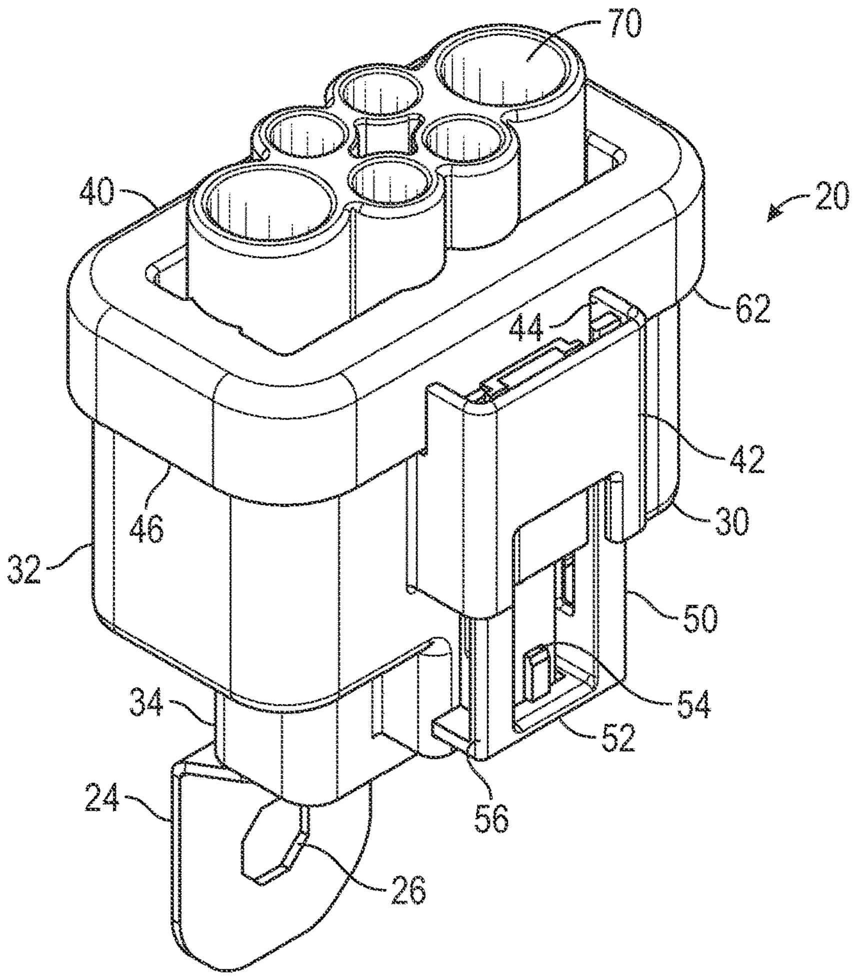
FIG. 5 is a schematic, perspective view of the grounding electrical connector assembly, with the terminal-connector lock in the release position.
Figure 6:
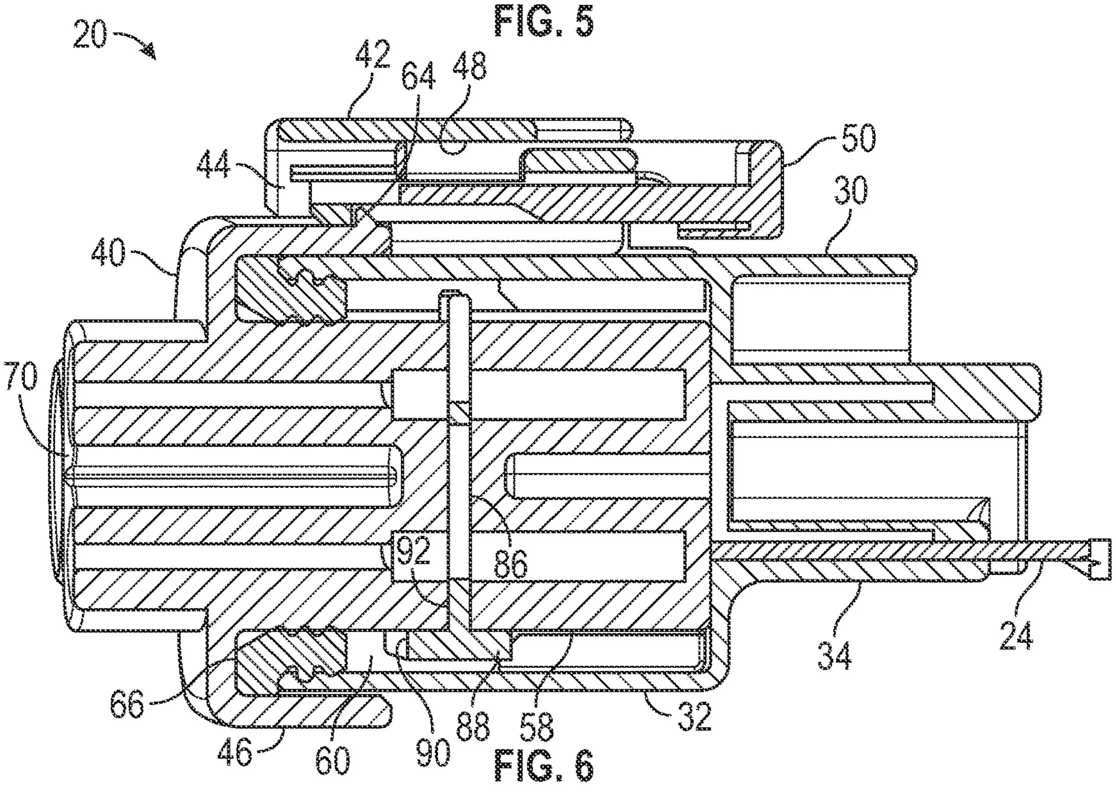
FIG. 6 is a schematic, cross section view of a portion of the grounding electrical connector assembly, with the terminal-connector lock in the release position.
Figure 9:
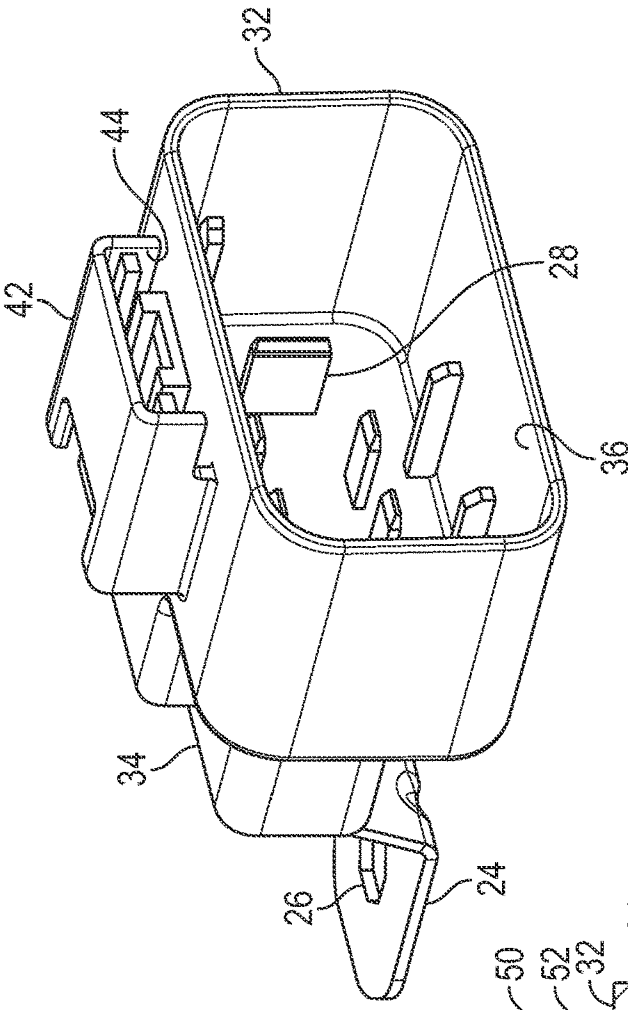
FIG. 9 is a schematic, perspective view of a connector housing and ground bus bar.
Figure 7:
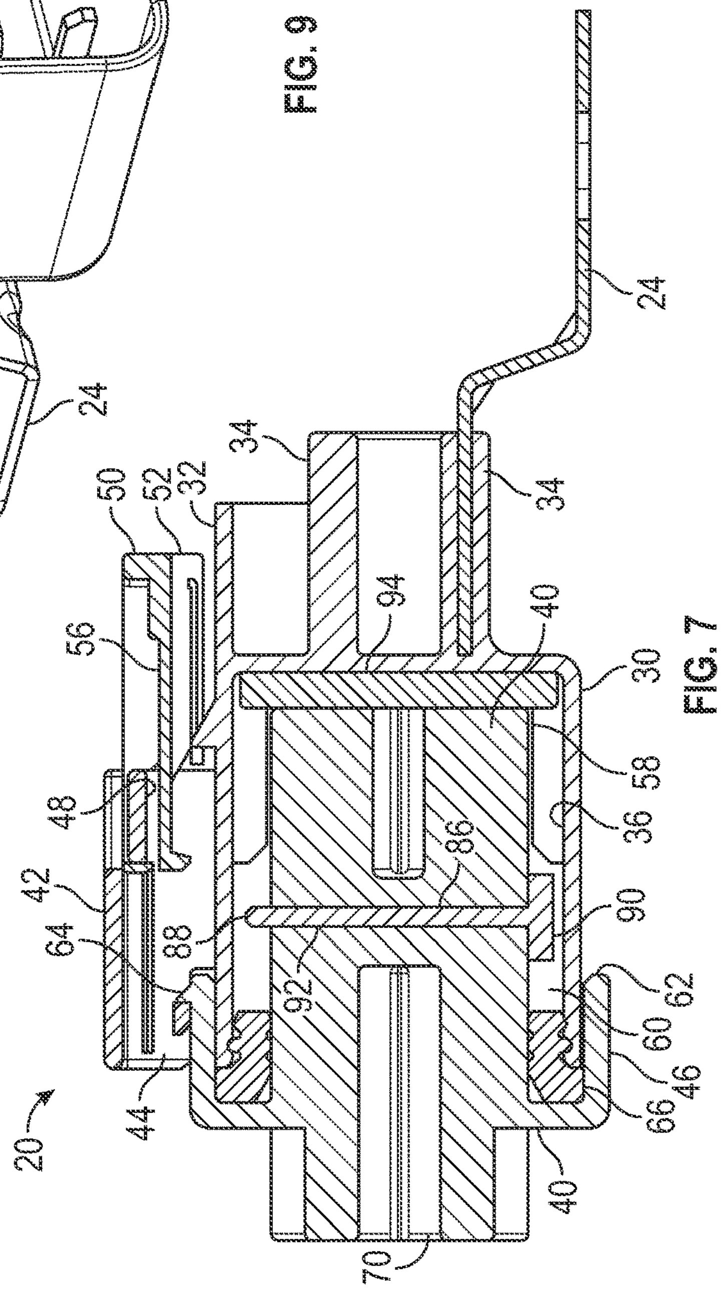
FIG. 7 is another schematic, cross section view of the grounding electrical connector assembly, with the terminal-connector lock in the release position.
Figure 8:
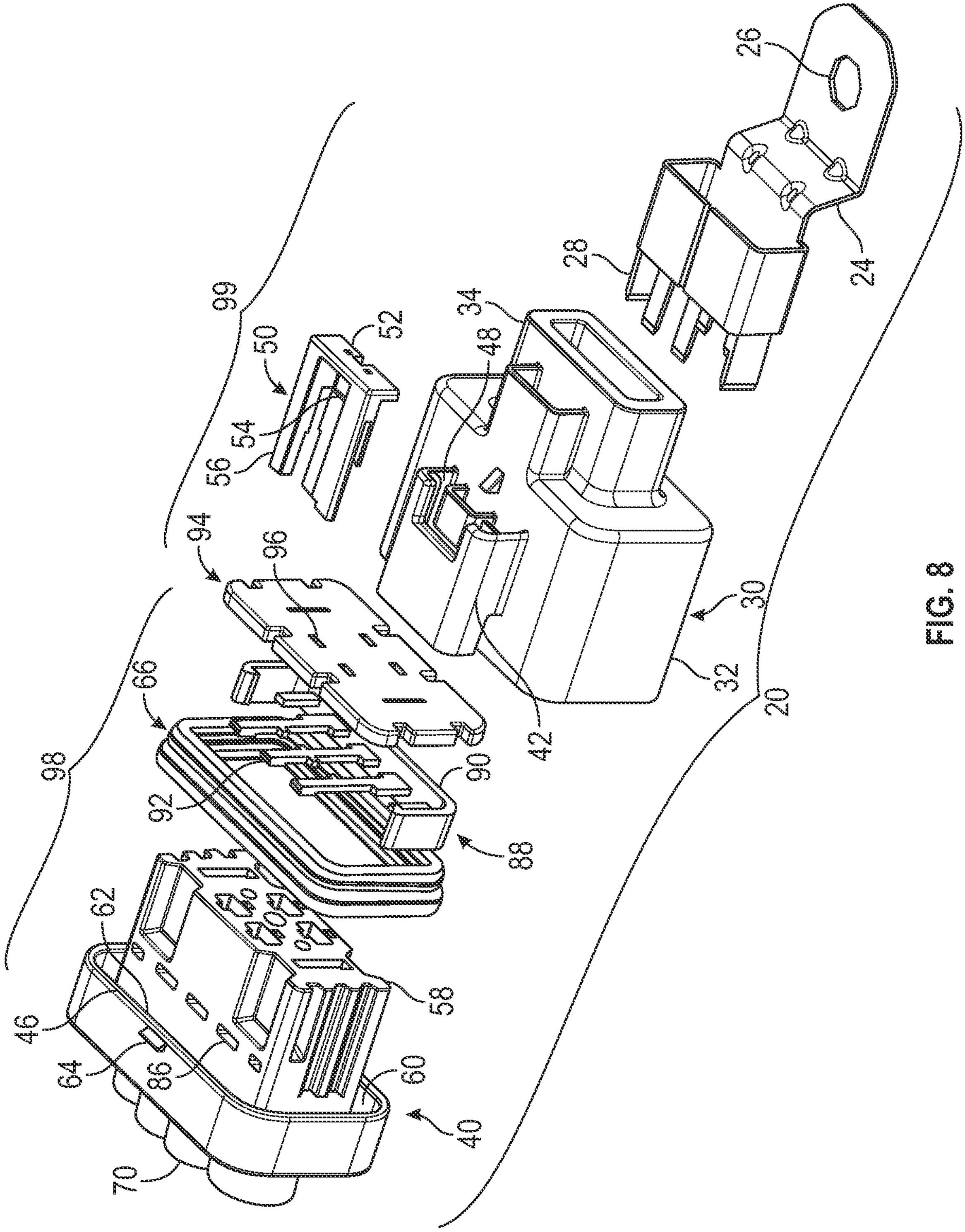
FIG. 8 is a schematic, exploded, perspective view of the grounding electrical connector assembly.
Figure 10:
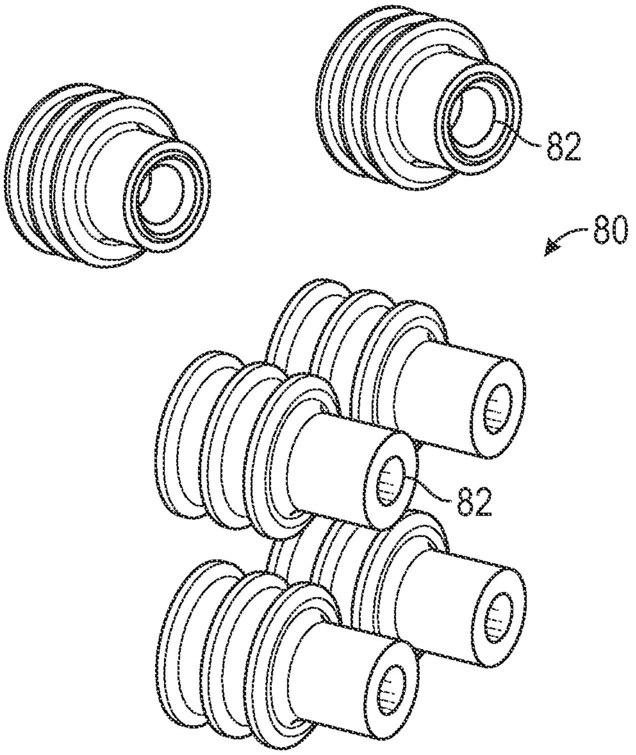
FIG. 10 is a schematic, perspective view of terminal seals that may be employed in a terminal housing of the grounding electrical connector assembly.

Terminal seals 80 (see FIG. 10), with wire passages 82 through which respective wires pass, may be located adjacent to respective ones of the terminals 72. Upon insertion of the terminals 72 in their respective terminal passages 70, each terminal seal 80 is inserted into the corresponding terminal passage 70, which may be retained by compressing the outer surfaces of the terminal seals 80, thus sealing each terminal passage 70 from liquids and debris. In the example of FIG. 10, six terminal seals 80, two large and two small, are shown, corresponding to the number of terminal passages 70 in the terminal housing 40. This number may change based on the number of terminal passages 70 in the terminal housing 40 for the particular grounding application.

The main body 58 of the terminal housing 40 may also include terminal position lock recesses 86 (best seen in FIGS. 2, 6 and 7), which may extend generally normal to the direction of the terminal passages 70. A terminal position lock 88 may have a release arm 90 that extends along an outer surface of the main body 58, with retention flanges 92 extending from the release arm 90 into respective terminal position lock recesses 86. The terminal position lock recesses 86 are positioned such that, after inserting the terminals 72 in their respective terminal passages 70, the retention flanges 92 are inserted into their respective terminal position lock recesses 86, holding the terminals 72 in their desired position in the terminal passages 70.

A seal 94 (shown in FIGS. 7 and 8) may optionally be inserted into the terminal cavity 36 of the connector housing 30, with the main body 58 of the terminal housing 40 abutting the seal 94 when the terminal housing 40 is assembled to the connector housing 30. The seal 94 may include apertures 96 through which the electrical contacts 28 extend.

The assembly and operation of the grounding electrical connector assembly 20 will now be discussed with regard to FIGS. 1-12. The grounding electrical connector assembly 20 may be partially assembled into to two separate subassemblies, making installation and removal (or partial removal) easier, quicker and in many cases without a need for tools.

A connector subassembly 99 may include the connector housing 30, the ground bus bar 24, the terminal connector lock 50 and optionally the seal 94. The connector housing 30 may be assembled to (such as by over-molding over) a portion of the bus bar 24, the terminal connector lock 50 may be telescopically slid into the second slot 48 of the shoulder 42 of the body 32, and the seal 94 may be slid into the terminal cavity 36 of the body 32. The connector subassembly 99 is now ready to be assembled to the grounding bolt 22, a terminal subassembly 98 or both (in either order of assembly).

The terminal subassembly 98 may include the terminal housing 40, the terminal position lock 88 and the radial seal 66. The radial seal 66 may be assembled to the terminal housing 40 by sliding it over the main body 58 into the gap 60. The wires 16, terminals 72 and terminal seals 80 may be assembled separately so they are ready to be received by the terminal passages 70 of the terminal housing 40. For example, wires 16 may each slide through the wire passages 82 of respective terminal seals 80 (of the corresponding size), and each have terminals 72 (of the corresponding size) secured to the respective wire 16. The wires 16 may then be assembled to the terminal housing 40 by telescopically inserting each wire into a respective terminal passage 70 and pressing the terminal seals 80 into the ends of the respective terminal passages 70. The retention flanges 92 of the terminal position lock 88 may be slid into the terminal position lock recesses 86, thus assuring the retention of the terminals 72 in the terminal housing 40.

The grounding electrical connector assembly 20, having the two subassemblies 98 and 99 allows for different ways to install and remove all or portions of the assembly 20. This may be particularly advantageous for applications where the packaging space around the assembly 20 is tight, making grounding of the wires 16 easier.

For example, the grounding bolt 22 may be inserted through the opening 26 and secured to the grounding structure 18, with just the connector subassembly 99. Accordingly, the wires and terminal subassembly 98 are not in the way when securing the bolt 22. After securing the bolt 22 to the structure, the terminal subassembly 98 may be connected to the connector subassembly 99 by telescopically sliding the main body 58 of the terminal housing 40 into the terminal cavity 36 of the connector housing 30 while the terminal-connector lock 50 is in the release position (shown in FIGS. 1-3 and 5-7). The main body 58 is slid in until the body 32 of the connector housing 30 is pressed against the radial seal 66, thus sealing from moisture and debris between the connector housing 30 and the terminal housing 40. The insertion of the main body 58 of the terminal housing 40 into the terminal cavity 36 of the connector housing 30 also causes the terminals 72 to contact their respective electrical contacts 28, thus assuring an electrical connection between the wires and the bus bar 24/grounding bolt 22. Additionally, the release arm 90 of the terminal position lock 88 is prevented from being removed (see FIGS. 6 and 7), so the retention flanges 92 stay in place, holding the terminals 72 in the proper position in their terminal passages 70. After insertion of the terminal housing 40, the terminal-connector lock 50 may be telescopically slid into the second slot 48 to a lock position (see FIG. 4) where the latch 54 is engaged to the shoulder 42, securing the retention barb 64 of the retention arm 46 in the first slot 44 of the shoulder 42. This effectively locks the terminal subassembly 98 to the connector subassembly 99.

In another example of assembly of components, the terminal subassembly 98 may be assembled to the connector subassembly 99, as discussed above, and then the entire grounding electrical connector assembly 20 may be grounded by securing the grounding bolt 22 to grounding structure 18.

Moreover, should some or all of the grounding electrical connector assembly 20 need to be removed for repair or replacement, there are multiple ways to easily disassemble the grounding structure. For example, one may remove the grounding bolt 22 from the grounding structure to allow for removal of the connector assembly 20 in one piece. Alternatively, one may leave the grounding bolt 22 and connector subassembly 99 attached to the grounding structure 18 and just remove the terminal subassembly 98. In this case, one engages the finger pull 52 of the terminal-connector lock 50 and pulls the latch 54 out of engagement with the shoulder 42, sliding the arms 56 partially out of the second slot 48. This action frees the retention arm 46 of the terminal housing 40, allowing the terminal subassembly 98 to be removed from the connector subassembly 99. This type of disassembly may be conducted without tools since the bolt 22 remains secured, which may be much easier when the connector assembly 20 is installed in areas with tight packaging (e.g., different areas in/on a vehicle). At this point, the terminal position lock 88 may be removed, and the wires 16/terminals 72 removed from terminal passages 70 as needed for repair or replacement. When ready to reassemble, the procedure for assembling the terminal subassembly 98 to the connector subassembly 99, discussed above, may be employed.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An electrical connector assembly, comprising:

a connector sub-assembly comprising a connector housing, wherein the connector housing includes:

a connector body configured to define a terminal cavity, a ground bar including a plurality of electrical contacts extending into the terminal cavity, and a portion configured to be secured to a grounding structure, wherein the connector housing is overmolded onto the ground bar;

a terminal sub-assembly comprising a terminal housing that includes:

a terminal main body configured to define a plurality of terminal passages configured to receive a plurality of terminals;

a retention arm configured to define a circumferential gap between the terminal main body and the retention arm; and a radial seal disposed in the circumferential gap and compressed between the retention arm and the terminal main body;

wherein the terminal main body defines terminal position lock recesses extending through the terminal main body in a direction that is perpendicular to the plurality of terminal passages, and wherein the terminal sub-assembly further comprises a terminal position lock configured to be slidable in the terminal position lock recesses to releasably retain the plurality of terminals in the terminal housing when in a retention position; and a terminal-connector lock that is telescopically slidable in a slot of the connector housing to secure a retention member of the terminal sub-assembly with the connector sub-assembly for securing the plurality of terminals associated with the terminal sub-assembly with a respective electrical contact of the plurality of electrical contacts, and wherein the retention arm is configured to be releasably secured to the connector housing, when the terminal sub-assembly is assembled to the connector sub-assembly and the terminal-connector lock is moved to a lock position.

2. The electrical connector assembly of claim 1, wherein the retention arm includes the retention member, and wherein the terminal-connector lock includes a finger pull configured to be acted upon to move the terminal-connector lock between the lock position and a release position such that, when the terminal sub-assembly is assembled to the connector sub-assembly and the terminal-connector lock is in the lock position, the retention member secures the terminal housing with the connector housing.

3. The electrical connector assembly of claim 1, wherein the terminal position lock is configured to be prevented from moving out of the retention position by the connector housing when the terminal sub-assembly is assembled to the connector sub-assembly.

4. The electrical connector assembly of claim 3, wherein when the terminal sub-assembly is not assembled with the connector sub-assembly, the terminal position lock is configured to be removable from the terminal position lock recesses, and wherein when the terminal position lock is removed from the terminal position lock recesses, the terminal position lock does not retain the plurality of terminals in the terminal housing.

5. The electrical connector assembly of claim 1, wherein the portion of the ground bar is secured to the grounding structure based on an anti-rotation feature that is configured to prevent the ground bar from rotating relative to the grounding structure.

6. A grounding electrical connector assembly comprising:

a connector subassembly including a connector housing, wherein the connector housing includes:

a connector body comprises a terminal cavity, a ground bar, secured to the connector housing, comprising a plurality of electrical contacts, and a portion configured to be secured to a grounding structure, wherein the connector housing is over-molded onto the ground bar, and a terminal-connector lock that is telescopically slidable in a slot of the connector housing; and a terminal subassembly including a terminal housing, wherein the terminal housing includes:

a terminal main body comprises a plurality of terminal passages configured to receive respective terminal of a plurality of terminals, and a retention arm that is releasably secured to the connector housing such that the retention arm comprises a retention member that is adapted to secure the terminal housing to the connector housing, when the terminal subassembly is assembled to the connector subassembly and the terminal-connector lock is located in a lock position;

the terminal sub-assembly further comprises terminal position lock recesses extending through the terminal main body in a direction that is perpendicular to the plurality of terminal passages, and a terminal position lock configured to be slidable in the terminal position lock recesses to releasably retain the plurality of terminals in the terminal housing when located in a retention position.

7. The grounding electrical connector assembly of claim 6, wherein the terminal main body is telescopically slidable into the terminal cavity.

8. The grounding electrical connector assembly of claim 6, wherein the retention arm includes the retention member, and wherein the terminal-connector lock includes a finger pull configured to be acted upon to move the terminal-connector lock between the lock position and a release position such that, when the terminal subassembly is assembled to the connector subassembly and the terminal-connector lock is in the lock position, the retention member secures the terminal housing with the connector housing.

9. The grounding electrical connector assembly of claim 6, wherein, when the terminal subassembly is not assembled with the connector subassembly, the terminal position lock is configured to be removable from the terminal position lock recesses, and wherein when the terminal position lock is removed from the terminal position lock recesses the terminal position lock does not retain the plurality of terminals in the terminal housing.

10. The grounding electrical connector assembly of claim 6, wherein the portion of the ground bar is configured to be secured to the grounding structure based on an anti-rotation feature that is configured to prevent the ground bar from rotating relative to the grounding structure.

11. The grounding electrical connector assembly of claim 6, wherein the plurality of terminal passages comprises a plurality of flanges configure to secure each of the plurality of terminals to each of the plurality of terminal passages.

12. The grounding electrical connector assembly of claim 6, wherein the connector subassembly further comprises a seal configured to be inserted into the terminal cavity.

13. The grounding electrical connector assembly of claim 6, wherein the terminal-connector lock comprises a pair of arms that slides into the slot to secure the retention arm.

* * * * *